3,573,184
PROCESS FOR PREPARING CARBOHYDRATES

Matilda M. Brooks, Berkeley, Calif., assignor to
Kent H. Steffgen, Oakland, Calif.
No Drawing. Filed Nov. 15, 1968, Ser. No. 776,256
Int. Cl. B01j 1/10, 1/12
U.S. Cl. 204—160.1      6 Claims

ABSTRACT OF THE DISCLOSURE

The specification relates to a process for the synthetic preparation of basic plant carbohydrates. In this process, a mixture of magnesium and carbon dioxide dissolved in water is placed in a source of ultraviolet wave lengths to form a highly energized polyatomic $CH_2O$ free radical. The $CH_2O$ free radical is then placed in darkness to provide the desired carbohydrate.

---

It is known that carbohydrates are provided in plants by photosynthesis. However, it has not been possible heretofore to form these carbohydrates by a synthetic photosynthesis process.

It has now been discovered that carbohydrates can be provided synthetically, i.e., in the absence of chlorophyll or living green plant cells. Thus in accordance with a first embodiment of the invention, carbon dioxide is dissolved in water to form a solution. The solution is mixed with a catalytic amount of magnesium, such as an aqueous solution of magnesium chloride. This mixture is then contacted with wave lengths in the ultraviolet region to provide an unstable polyatomic $CH_2O$ free radical which is highly energized. Subsequently, the $CH_2O$ free radical is placed in darkness where it loses energy to form glucose or other carbohydrates.

A carbohydrate is defined in this invention as any well known basic plant carbohydrate and this definition includes derivatives thereof and includes basic plant acids. Accordingly, the process of the invention is suitable for preparing polyhydroxy aldehydes (aldoses) and polyhydroxy ketones (ketoses). This includes among other aldohexoses, e.g., glucose, mannose and galactose; aldopentoses; aldotetroses; glycerose; desoxyaldoses, e.g., rhamnose; and ketoses, e.g., fructose and sorbose. Disaccharides, e.g., maltose, lactose, sucrose; trisaccharides, e.g., raffinose; homopolysaccharides, e.g., starch, glycogen, inulin, cellulose; and heteropolysaccharides, e.g., agar, can also be prepared by this process. The basic plant acids which can be provided by this invention include among others, oxalic acid, tartaric acid, malic acid and citric acid.

A first step in the process of the invention is to prepare a solution of carbon dioxide dissolved in water. The amount of carbon dioxide can be from about 1% up to saturation. The solution can be prepared by any satisfactory method. For instance, Dry Ice can be added to tap water. However, carbonic acid or an oxalate, such as ferrous oxalate, may be employed.

The aqueous solution of carbon dioxide is then contacted with elemental magnesium or a magnesium compound in the absence of chlorophyll and living green plant cells but in the presence of ultraviolet wave lengths. Frequently, an aqueous solution is employed containing about 1% to 8% of a magnesium salt. Both an inorganic salt, such as magnesium chloride, magnesium nitrate, magnesium sulfate and the like, and an organic salt, such as magnesium oxalate and the like, are suitable. Generally, about 1% to 99%, e.g., about 25% to 75%, of the magnesium solution is mixed with about 99% to 1%, e.g., 75% to 25%, of the aqueous solution of carbon dioxide.

Any source of ultraviolet wave lengths can be used in the invention. Among others, this includes sunlight and tungsten and mercury filaments or the like. Generally, the wave lengths are about 2915 to 2971 Angstroms. During this exposure, two electrons are removed from magnesium and the magnesium with a high positive charge then attracts two oxygen electrons—one oxygen electron from the water and the other oxygen electron from the carbon dioxide. The remaining two hydrogen atoms from water are attracted to the remaining carbon and oxygen atoms from carbon dioxide and temporarily unite as a $CH_2O$ molecule. This $CH_2O$ molecule, which is not the same as formaldehyde, is in a highly energized state produced by exposure to sunlight or the like. Accordingly, the time of exposure is that which is necessary to provide the aforementioned highly energized $CH_2O$ free radical, i.e., one second or longer.

The highly energized $CH_2O$ free radical is subsequently placed in darkness. The $CH_2O$ atoms and electrons, which are all unstable, lose their energy in the dark and form various carbohydrates, such as glucose, as they drop back to the stable energy level in the negative region of the redox potential. In other words, as the electrons lose their energy in the dark, simple free radicals are split off at different energy levels thereby forming a specific carbohydrate. Accordingly, the time of exposure to darkness may be one second or longer, and it depends upon the energy level which is desired. For instance, when ground level is reached ($E_0$ redox potential of $-.4$), glucose is formed. Other carbohyrates are formed at intermediate energy levels.

The glucose or other carbohydrate formed can be recovered by any satisfactory method. One method is to precipitate glucose from solution by adding 100% ethyl alcohol. The precipitated glucose then can be dried, if necessary, by any suitable procedure, such as air drying.

Thus in accordance with this invention it is now possible to form basic plant carbohydrates by a synthetic photosynthesis process. This is surprising since heretofore it was considered necessary to have chlorophyll or living green plant cells.

The following example is submitted to illustrate but not to limit this invention. Unless otherwise indicated, all parts and percentages in the specification and claims are based upon weight.

EXAMPLE I

Dry Ice was added to a beaker of water until a saturated solution of carbon dioxide in water was formed. One hundred parts of this solution was mixed with 100 parts of a 5% aqueous solution of magnesium chloride. The mixture was placed in sunlight for one hour and it was subsequently placed in total darkness overnight whereby glucose was formed. The glucose was precipitated out of solution by adding 100% ethyl alcohol followed by air drying.

Benedict solution was added to the dried product with heating. A reddish-brown precipitate was formed which indicates that the product was glucose.

Having set forth the general nature and specific embodiments of the present invention, the true scope is now particularly pointed out in the appended claims.

What is claimed is:

1. A process for preparing glucose in the absence of chlorophyll and living green plant cells which comprises forming an aqueous solution containing carbon dioxide in an amount from about 1% to saturation and containing magnesium in a catalytic amount; contacting the solution of carbon dioxide, water and magnesium with ultra-violet wave lengths for a sufficient time to form an aqueous solution containing a highly energized, unstable $CH_2O$ free radical other than formaldehyde; and placing said aqueous solution containing said $CH_2O$ free radical subsequently in darkness for a sufficient time to provide glucose.

2. A process for preparing glucose in the absence of chlorophyll and living green plant cells which comprises forming between about 1% to saturated solution of carbon dioxide in water; mixing the carbon dioxide solution with an aqueous solution containing about 1% to 8% magnesium salt to form a mixture having about 1% to 99% of the magnesium solution to about 99% to 1% of the carbon dioxide solution; exposing the mixture to ultraviolet wave lengths from about 2915 to about 2971 angstroms for at least about one second to provide an aqueous solution containing a highly energized unstable $CH_2O$ free radical other than formaldehyde; and placing subsequently said aqueous solution containing said $CH_2O$ free radical in darkness for at least about one second to provide glucose.

3. A process for preparing glucose in the absence of chlorophyll and living green plant cells which comprises forming an aqueous solution containing carbon dioxide in an amount of about saturation and containing magnesium in a catalytic amount; contacting the solution of carbon dioxide, water and magnesium with ultraviolet wave lengths for a sufficient time to form an aqueous solution containing a highly energized, unstable $CH_2O$ free radical other than formaldehyde; and placing said aqueous solution containing said $CH_2O$ free radical subsequently in darkness for a sufficient time to provide glucose.

4. A process for preparing glucose in the absence of chlorophyll and living green plant cells which comprises forming an aqueous solution containing carbon dioxide in an amount from about 1% to saturation and containing magnesium in a catalytic amount; contacting the solution of carbon dioxide, water and magnesium in the presence of sunlight as a source of ultraviolet wave lengths for a sufficent time to form an aqueous solution containing a highly energized, unstable $CH_2O$ free radical other than formaldehyde; and placing said aqueous solution containing said $CH_2O$ free radical subsequently in darkness for a sufficient time to provide glucose.

5. The process according to claim 1 in which the magnesium is provided as an aqueous solution of a magnesium salt.

6. The process according to claim 1 in which the source of ultraviolet wave lengths is sunlight, tungsten filaments or mercury filaments.

References Cited

UNITED STATES PATENTS 3,368,954   2/1968   Goda _____ 204—160.1

MURRAY TILLMAN, Primary Examiner

R. B. TURER, Assistant Examiner

U.S. Cl. X.R.

260—209, 212, 233.3